United States Patent [19]

Yamamoto

[11] Patent Number: 4,886,134
[45] Date of Patent: Dec. 12, 1989

[54] BLIND CABLE ASSEMBLY

[75] Inventor: Mayjue A. Yamamoto, Yellow Springs, Ohio

[73] Assignee: General Motors Corporation, Detroit, Mich.

[21] Appl. No.: 286,109

[22] Filed: Dec. 19, 1988

[51] Int. Cl.$^4$ ............................................. F11D 51/00
[52] U.S. Cl. ..................................... 188/20; 188/78; 188/106 F; 188/106 A; 188/325
[58] Field of Search .................. 188/2 O, 78, 79, 325, 188/328, 331, 106 R, 106 A, 106 F, 106 P; 74/501.5, 502.4, 502.5, 502.6; 267/179, 180

[56] References Cited

U.S. PATENT DOCUMENTS 4,595,084 6/1986 LeDeit ...................... 188/106 A X
4,753,325 6/1988 Jaksic ........................ 74/502.6 X Primary Examiner—Andres Kashnikow
Assistant Examiner—Matthew L. Graham
Attorney, Agent, or Firm—Ernest E. Helms; D. D. McGraw

[57] ABSTRACT

A drum brake assembly having a parking brake actuating lever is so arranged that the parking brake cable end may be assembled in a blind fashion to the end of the actuating lever. The cable is provided with a button. The lever has a return spring which has one end attached to the lever and the other spring secured to the backing plate about a parking brake cable opening through the backing plate. The spring end attached to the lever has a retaining ramp and a hook end, the retaining ramp being above an open channel formed on the lever end and the hook end being secured to the lever one end above the channel. The cable button is inserted axially through the backing plate opening provided for the cable and through the spring, being guided by that spring, to a point above the channel open receiving end. Further axial insertive movement of the button causes the button and the cable to be deflected upwardly by the channel edge surface ramp portion and the sides of the backing plate and the lever, side loading the cable. The button passes the end of the ramp portion and the channel open other end, the stored force in the cable because of the side loading moves the cable downwardly in the channel, so that as the cable is then tensioned the lever will be moved to actuate the brake.

3 Claims, 1 Drawing Sheet

U.S. Patent
Dec. 12, 1989
4,886,134
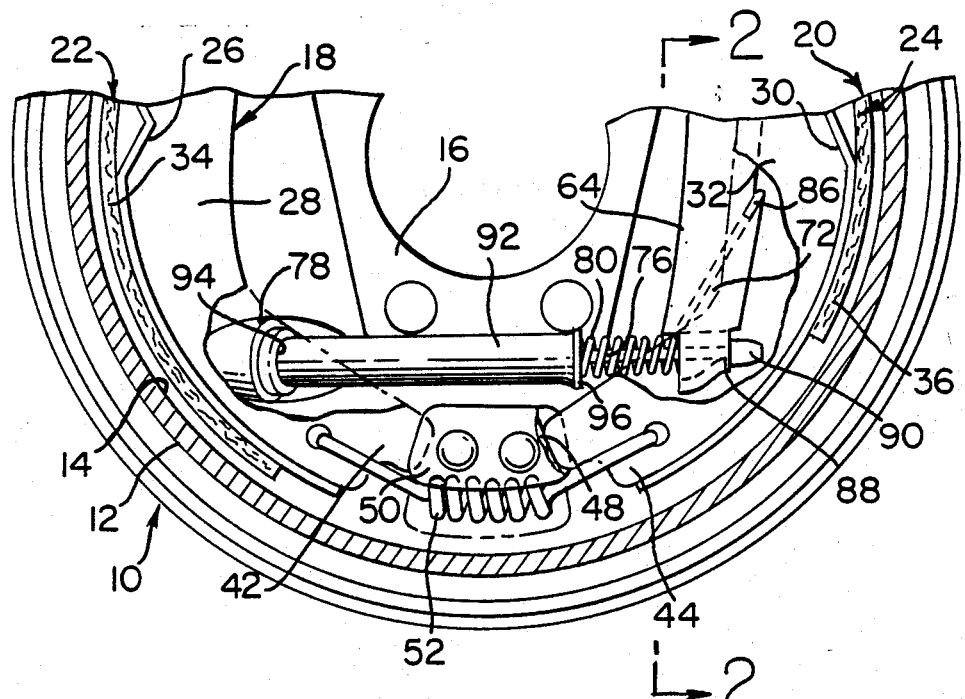
FIG. 1
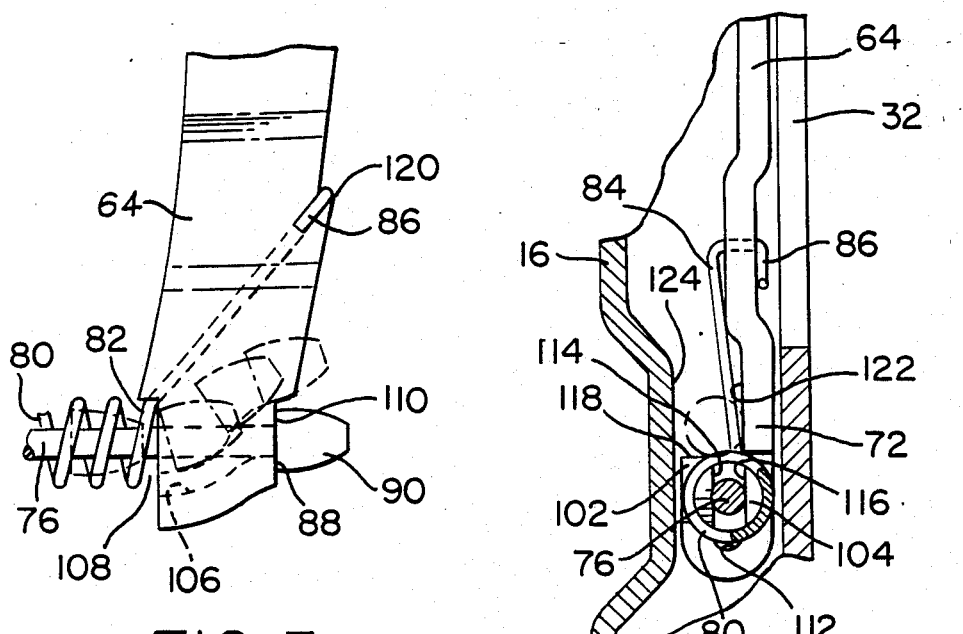
FIG. 3
FIG. 2

BLIND CABLE ASSEMBLY

CROSS-REFERENCE TO RELATED APPLICATIONS

The arrangement embodying the invention is related to the broad concept disclosure of U.S. patent application Ser. No. 117,120, filed on Nov. 4, 1987, entitled "Blind Assembly of Parking Brake Cable to Parking Brake Lever," and assigned to the common assignee. That disclosure specifically employed a slotted funnel guide and retention member formed on the parking brake lever, and disclosed several types of guide members.

The invention is also related to U.S. patent application Ser. Nos. 7/286,112, entitled "Blind Assembly of Parking Brake Cable to Parking Brake Lever"; and 7/286,114, entitled "Blind Cable Assembly"; both filed on even date herewith. It is a modification of the invention claimed in Ser. No. 7/286,114.

BACKGROUND OF THE INVENTION

Typical drum brake parking brake actuating mechanisms used on automobiles for many years (and still being used) have required that the parking brake cable be inserted through the backing plate opening and positioned in approximate relation to the connection point with the parking brake actuating lever, which is pivotally mounted on one of the brake shoe assemblies. The assembly operator then has to maneuver the end of the parking brake cable and/or the parking brake actuating lever to make the connection. This therefore requires that such an assembly be done with the drum brake's being off of the remainder of the brake assembly so that visual and manipulative capabilities are present to complete the assembly. A typical example of such a connection requiring this type of assembly is disclosed in U.S. Pat. No. 3,064,767 entitled "Brake Actuator," and issued Nov. 20, 1962.

FIELD OF THE INVENTION

The invention relates to a drum brake having an internal parking brake lever with the parking brake cable ettry being through the backing plate. It more particularly relates to such a drum brake in which the connection of the parking brake cable to the parking brake lever within the drum brake assembly is made in a blind manner; that is, with the person assembling the cable to the lever being able to do so with the drum brake completely assembled on the vehicle.

The arrangement embodying the invention permits the parking brake cable assembly to be inserted through the appropriate opening in the backing plate and to be guided and connected to an end of the parking brake actuating lever which is pivotally mounted on one of the brake shoe assemblies, without the assembly operator's having to see the parts as they are approached and then having to manipulate the parts so as to make the connection. In this arrangement, the cable assembly is inserted through an apertured boss in the backing plate and pushed axially inward into the drum brake assembly. Since the drum is already in position as a part of the drum brake assembly, and therefore covers the brake shoes and closely approaches the backing plate and shield, the assembly is what is known as a blind assembly because the operator cannot see or manipulate each of the components being attached together within the drum brake assembly.

The arrangement is such that, once the mechanism is installed and in position, the assembly operator may pull outwardly on the parking brake cable and check that the cable is properly engaged with and secured to the end of the parking brake actuating lever. Once such engagement is confirmed, the assembly is completed by inserting a conduit assembly into snap-in engagement with a tube guide mounted in the backing plate opening, completing the cable assembly into the brake.

SUMMARY OF THE INVENTION

Assembly of the parking brake actuating cable end to the parking brake lever is accomplished with the brake drum installed by inserting the cable end having a ball or button thereon into the open end of a compression spring which, during assembly, protrudes through the cable entry opening in the backing plate. The spring guides the cable end into a ramped camming guide and retaining channel formed in the end of the parking brake lever. The spring end connected to the end of the parking brake lever beyond the channel with a spring intermediate portion joining the last spring coil. This ramp is positioned so as to be engaged by the cable end ball should that ball tend to rise too far out of the channel. The bottom of the channel is ramped upwardly, causing a deflecting force to be exerted on the cable end as the cable and ball are moved through the channel during installation. The deflection of the cable end causes a downwardly exerted spring force in the cable. As the ball on the cable end passes over the end of the channel ramp, the downward spring force causes the ball to drop into position behind the lever, with the cable resting in the bottom of the channel. The cable is then locked into position by the back side of the parking brake lever under which the cable end ball is positioned. The lever channel is formed in a "J" shape on the lever end, with the open part of the "J" being on the backing plate side of the lever, and the lever being between the backing plate and the web of the shoe on which the lever is pivotally mounted. The coil ramp section extends laterally toward the backing plate to an extend sufficient to trap the cable ball and prevent it from being removed by passing it between the coil ramp and the backing plate.

In order to accomplish this, the parking brake cable must be capable of being aimed or prepositioned so that, upon axial assembling movement thereof, it is able to engage the end of the parking brake actuator and then to accomplish the connection. As more fully disclosed in Application Ser. No. 117,120 noted above, this may be done in one manner by providing a tube guide, mounted in an opening in the backing plate, which extends from a laterally offset position at the backing plate to a laterally aligned position in spaced relation to the guide and retention means of the actuating lever so that when the parking brake cable is inserted and moved axially, the enlarged cable end section will be guided and connected as above noted. The parking brake actuating lever return spring is provided about the parking brake cable and will also act as a guide for the cable and its enlarged button-like end, particularly throughout the space between the end of the tube guide and the point at which the cable enlarged end or button is received by the guide and retention means. The invention is here illustrated in conjunction with that arrangement. Another arrangement is disclosed in applications Ser. Nos.

117,120 and 7/286,114. In that arrangement, the tube guide is short, so that it extends through only a small part of the distance between the opening in the backing plate in which it is mounted and the actuating lever guide and retention means. In that instance it is necessary to provide a separate spring guide and support so that the spring is supported properly for blind assembly, as above noted. The spring then acts as a guide member for the cable button as it is moved from the end of the tube guide to the retaining means on the parking brake lever lower end.

In either arrangement, it is preferred that the guide and return spring have one end thereof operatively secured to the backing plate for spring reaction. It may be secured in the conduit assembly provided on the parking brake cable assembly in the area where it may be located from the outside of the backing plate to a point within and connected to the tube guide, which is mounted through the backing plate opening. Thus the parking brake cable assembly includes the conduit assembly, the parking brake cable itself, the cable return spring with its ramp and hook end, and a parking brake cable enlarged end such as a ball or button.

The operator will insert the parking brake cable assembly through the tube guide and move the cable and its enlarged end axially through the spring until the blind connection is completed. The operator may then pull back on the parking brake cable to check that the connection is actually completed, feeling an appropriate resistance to such movement. The conduit assembly may then be snapped in position in the tube guide.

It is therefore a feature of the invention therein disclosed and claimed to provide a ramped guide channel and a retaining ramp mechanism which permits a blind assembly of one parking brake cable end to one end of the parking brake actuating lever, the retaining ramp being formed by a part of the cable guide and parking brake lever return spring. This provides a more simple parking brake lever lower end which is easier to manufacture than some other proposed lever lower ends. It also guards against any inadvertent disconnection of the cable from the lever.

BRIEF DESCRIPTION OF THE DRAWING

FIG. 1 is an elevation view of the lower half of a drum brake assembly embodying the invention, with parts broken away and in section;

FIG. 2 is an enlarged fragmentary cross-section view of a portion of the assembly of FIG. 1, taken in the direction of arrows 2—2 of that FIGURE and illustrating further details of the invention;

FIG. 3 is a fragmentary elevation view of a portion of FIG. 1 showing the preferred embodiment of the invention with portions thereof in elevation. The deflected position of the cable end is illustrated in phantom.

DESCRIPTION OF THE PREFERRED EMBODIMENT

The drum brake assembly 10 of FIG. 1 includes a rotatable drum 12 having an internal drum friction surface 14. The assembly has a backing plate 16 on which is mounted a first brake shoe assembly 18 and a second brake shoe assembly 20 for movement into and out of engagement with the drum friction surface 14 for brake actuation and release, as is well known in the art.

Shoe assemblies 18 and 20 respectively include shoes 22 and 24 respectively composed of a rim 26 and a web 28, and a rim 30 and a web 32. Shoe assembly 18 has a brake lining 34 secured to the rim 26, and shoe assembly 20 has a brake lining 36 secured to rim 30. The outer surfaces of the linings 34 and 36 provide lining friction surfaces which mate with the drum friction surface 14 during brake actuation. The shoe assemblies 18 and 20 respectively have upper shoe ends (not shown) and lower shoe ends 42 and 44. The upper shoe ends are arranged to be operatively engaged by pistons in the wheel cylinder (not shown) so that the shoe assembly may be hydraulically actuated for service brake operation as more fully disclosed in the patent applications noted above. As is well known in the art, a suitable service brake operator, such as a master cylinder, provides hydraulic brake fluid under pressure to the wheel cylinder to expand the pistons therein and move the upper shoe ends apart so that the linings 34 and 36 are moved into braking engagement with the drum friction surface 14. In the particular brake assembly 10 illustrated, the brake shoe assemblies are arranged in a leading-trailing manner. Therefore, the lower shoe ends 42 and 44 are positioned to engage a fixed anchor 48 at the bottom of the assembly and radially opposite the wheel cylinder. The lower shoe ends are guided in position relative to the backing plate by the shoe retainer 50 which is secured to anchor 48. The lower shoe ends 42 and 44 are continuously urged toward the anchor 48 by the spring 52.

The drum brake assembly 10 may also be of other well known types such as the duo servo, leading-leading, and trailing-trailing types. Although not shown, it is to be understood that a suitable brake shoe return spring is connected to the brake shoe rims 26 and 30 in the general area of the wheel cylinder so as to continually urge the upper shoe ends toward the retracted position. This arrangement is also well known in the art.

The brake assembly in copending application Ser. No. 7/286,114 is illustrated as having a brake adjuster mechanism, which includes a spreader bar or strut, an adjuster wheel, and an adjuster lever, all well known in the art. That disclosure is hereby incorporated herein by reference. The spreader bar or strut is typically provided in two pieces threadedly joined for adjusting purposes. The strut extends into recesses formed in brake shoe webs 28 and 32 near the upper shoe ends so as to be retained in proper position relative to the shoes. Since this particular brake assembly is one which also provides for mechanical parking brake actuation, the strut also acts as a mechanical spreader bar when the parking brake is applied.

The parking brake assembly has a parking brake actuating lever 64, which has one end (not shown) pivotally mounted on the web 32. Lever 64 is also provided with a recess, which also receives one end of the spreader bar, as shown in the incorporated reference application. Lever 64 extends downwardly immediately adjacent to one side of web 32, between the backing plate 16 and web 32, terminating in a lever lower end 72. As is well known in the art, when lever 64 is pivoted clockwise as seen in FIG. 1, it will act to move the spreader bar against the brake shoe assembly 18, moving that assembly outwardly to engage the drum friction surface 14, with the lever reaction, exerted through the pivoted lever end and web 32, moving the brake shoe assembly 20 so that its lining also engages the drum friction surface 14. Thus, the brake assembly is mechanically actuated for parking brake purposes.

The drum brake assembly 10 is provided with a parking brake cable assembly 74. Assembly 74 is illustrated as including a cable 76 mounted for axial movement in a cable sheath (not shown). The sheath terminates in a cable conduit assembly (also not shown) located on the other side of the backing plate boss 78 while the cable 76 extends therebeyond inside the drum brake assembly, as will be further described. The other ends of cable 76 and its sheath are connected to a parking brake actuating mechanism, such as a pedal assembly, provided for ease of operation by the vehicle operator so that the cable 76 is tensioned when the pedal is actuated to actuate the parking brake mechanism.

The parking brake cable assembly 74 also includes a compression spring 80 which extends about the portion of cable 76 that extends further into the drum brake assembly beyond the guide tube 92. As can be better seen in FIG. 3, the spring end coil 82 is positioned for engagement with a portion of the lower end 72 of parking brake actuating lever 64. The end of spring 80 beyond end coil 82 has a retaining ramp section 84 and a hook end 86. The end 88 of cable 76 is provided with an enlarged end section or other element 90, commonly referred to as a ball, button or bullet.

A guide tube 92 is secured in the opening 94 formed in the boss 78 of the backing plate 16 through which the parking brake assembly is assembled. The guide tube 92 extends toward the lever end 72, being curved so that its terminus 96 is adjacent to but spaced from lever end 72. One spring end extends into the guide tube 92 and terminates therein so that it can transmit spring reaction forces to the backing plate 16. The other spring end formed by retaining ramp section 84 and hook end 86 is attached to the end 72 of the parking brake lever 64. Thus the spring 80 is somewhat curved as needed between guide tube terminus 96 and lever end 72 to provide a smooth guide path for button 90 from the time it is pushed beyond guide tube 92 until it is locked in position as shown in FIG. 2.

The lower end 72 of lever 64 is formed as an open "J" shape defining a bottom-ramped channel 100 by the bottom part of the "J" shape. Channel 100 has parallel sides 102 and 104 extending upwardly from the ramped bottom 106. It has an open receiving end 108 facing toward guide tube and an opposite opening end 110 at its other end. The ramped bottom 106 of channel 100 has a small radius bottom inner surface 112 which is about the same diameter as the diameter of cable 76, or only slightly larger. The inner walls 114 and 116 of channel sides 102 and 104 provide cable side guide surfaces. The upper edge surface 118 of channel side 102 is ramped in a similar profile to that of the channel ramped bottom 106. It is surface ramp 118 that is engaged by the bottom side of button 90 during assembly movement thereof. The button sides are in guided engagement with a part of lever 64 and a part of backing plate 16, as is best seen in FIG. 2, during button assembly movement.

A recess or notch 120 is provided in the side of the main body of the parking brake lever 64. Notch 120 is positioned above channel side 102 and also above channel opening end 110. The hook end 86 of spring 80 is retained in notch 120, as best seen in FIGS. 2 and 3. The ramp portion 84 of spring 80 begins at the top of spring coil 82 and extends upwardly at an angle above channel 100 to form a retaining ramp under which the button 90 must ride on surface ramp 118 as the cable 76 is moved axially rightward as seen in FIGS. 1 and 3.

When the parking brake cable end 88 and its button 90 are inserted through the backing plate opening 94 and tube guide 92 by substantially axial movement of the parking brake cable and button, the cable button 90 enters the spring 80 and is guided by it to the parking brake lever lower end 72. Cable 76 and button 90 are forcibly deflected in their path by the button's engagement with the surface ramp 118 and the guide surfaces defined by the side 122 of lever 64 and the side 124 of the backing plate 16. This deflection stores a cantilever spring-like side force in the cable urging the cable downwardly toward the bottom of the channel. Since the button 90 is considerably larger than the channel between its sides 102 and 104, the button cannot go within the channel. Retainer ramp section 84 prevents the button from moving upwardly and also from moving axially leftward, as seen in FIG. 2. Additional axial movement of the cable and its button positions the cable button immediately beyond the opening end 110 of the channel 100. This removes the deflective support for the cable, so the cable and its button 90 are moved by the stored force from the most rightward phantom position of FIG. 3 to the position shown in solid lines in that Figure. The button is therefore trapped in position, and will not reverse its movements when the cable is tensioned.

This completes the blind attachment of the cable to the parking brake actuating lever, the cable being in position so that when a tension force is applied thereto the force is transmitted to the parking brake actuating lever and will pivot that lever clockwise, as seen in FIG. 1, to mechanically apply the brake assembly.

When the assembler-operator has made the blind assembly to the extent above described, he exerts a tension force on the cable 76 by pulling on it in the direction away from the backing plate and feeling the resistance to movement of the cable because of the connection to the parking brake actuating lever 64. Having satisfied himself that the connection has been made, he may then insert the conduit assembly from the back side of the backing plate 16 and join it with the tube guide 92 so that the conduit assembly will be retained in the tube guide and sealed therein.

The embodiments of the invention in which an exclusive property or privilege is claimed are defined as follows:

1. In a blind cable assembly, a lever adapted to be pivotally moved to actuate a drum brake mechanism enclosed by a brake drum and a backing plate, said lever having one end formed to an open "J" shape with substantially parallel sides forming an axially extending, upwardly open, channel at the bottom of the "J", said channel having having an open receiving end and an open other end, and a ramp surface on the upper end of the one parallel side terminating in a free end; and a notch in one edge of said lever above said open other end;

a compression coil spring forming a lever return spring and a guide member, said coil spring having one end coil in abutting engagement with said channel sides at said open receiving end and having its other end operatively secured to and grounded for reaction on the backing plate around a backing plate opening so that said coil spring continually urges said lever in a brake released direction, said coil spring having a retaining ramp section extending from the upper side of said one end coil axially and laterally upward above said channel, and a hook end formed on the other end of said retaining ramp section from said one end coil, said hook end being received in said notch to hold said coil spring securely to said lever one end;

and a brake cable having a button on one end thereof, said cable being adapted to be tensioned to actuate the drum brake mechanism, said brake cable being blind-assembled to said lever by being inserted through through the backing plate opening into and through said coil spring and moved axially into camming engagement with said channel side ramped upper edge, said spring retainer ramp section and said backing plate and the side of said parking brake lever above said channel guiding and deflecting said button and a portion of said cable adjacent thereto laterally upward and axially past said channel, side loading said cable and storing a spring-like force therein, until said button has moved beyond said channel side edge ramp and the edges of said channel sides forming said channel open other end, the spring-like force stored in said cable then moving said cable and said button laterally so that said cable is positioned within said tapered channel near said channel bottom and said button is in abutting engagement with the edges of said channel sides forming said channel open other end, tensioning of said cable for brake application then being transmitted to said lever through said button to actuate the drum brake.

2. In an assembled drum brake assembly having a drum to be braked, first and second brake shoe assemblies mounted on a backing plate, service brake actuating means selectively acting on said shoe assemblies to move same into braking engagement with said drum, and parking brake actuating mechanism for mechanically moving said shoe assemblies into braking engagement with said drum for parking brake purposes, said parking brake actuating mechanism including a spreader strut extending between said shoe assemblies, a parking brake lever pivoted at one lever end on one of said shoe assemblies and engaging said strut when pivoted in one direction to spread said shoe assemblies apart and move same into braking engagement with said drum, a compression coil spring urging said parking brake lever to the brake released position, and a parking brake cable extending through an apertured boss in said backing plate and connected to the other end of said lever for actuation thereof by the application of tension through the cable, the improvement comprising:

means for blind assembly and connection of said parking brake cable to said lever other end while said drum brake assembly is fully assembled so that there is substantially no manual or visual access to the parking brake lever other end, said last named means comprising:

said other end of said parking brake lever having an open "J" shape providing an upwardly open channel;

said channel being defined by parallel sides joined by a rounded bottom with an inner walls forming the inner channel surfaces of said sides and said bottom, said channel further having an open receiving end facing said boss, an axially opposite open other end, and a ramp surface formed on the upper end of one channel parallel side laterally spaced from the main body of said lever;

a notch formed in the edge of said lever above said open other end;

said compression coil spring having one end operatively secured to said boss and the other end including a last coil, a retaining ramp section extending from said last coil, and a hook end, said last coil engaging said channel sides on the edges thereof adjacent to said open receiving end in compressive force relation, said retaining ramp section extending angularly upward above said channel with said hook end received in said notch and holding said spring ramp section and said spring last coil in place relative to said channel so that said retaining ramp section provides a ramp above said channel from said open receiving end to a point above said open other end and also at said notch;

said parking brake cable having a cable section of relatively small diameter and a button forming an enlarged cable end of substantially larger diameter than the diameter of said cable section, said enlarged cable end being on the end of said cable section connected with said lever other end:

said channel ramp surface and the sides of said backing plate and said lever acting, when said cable and said button are moved axially further into engagement with said channel ramp surface, to cam and guide said button and said cable upwardly above said channel laterally away from said channel bottom and axially toward said channel open other end, and, in doing so, side loading said cable in a cantilever spring manner so that said cable is being urged back toward said channel bottom;

said button, upon passing beyond said channel ramp surface and said channel open other end, being moved by the side loaded force stored in said cable to locate said cable near said channel bottom, said button then engaging the edges of said channel sides at said open other end and holding said cable in a locked and adjusted position relative to said parking brake lever and then being operative to exert actuating force on said parking brake lever when said parking brake cable is tensioned to actuate the parking brake.

3. In a blind cable assembly wherein a cable having a button on one end is to be secured to one end of a lever in an enclosed mechanism, the lever being arranged to actuate the enclosed mechanism in response to tension force applied thereto through the cable, the cable being inserted through an opening in a plate covering a part of the enclosed mechanism, the improvement comprising:

a compression coil lever return spring extending between the plate opening and the lever one end, said spring having an end coil with a retaining ramp section extending therefrom terminating in a hook end;

a guide channel formed on the lever one end and receiving said end coil in abutting spring force transmitting relation, said ramp section being received above said channel and extending axially and laterally thereabove with said hook end being hooked onto said lever one end to hold said spring on said lever one end;

said channel side edge ramp surface being engaged by the cable button as the cable and button are inserted axially through said spring in guiding relation therewith, above said guide channel, causing the cable button and the portion of said cable adjacent the button to become side loaded and to be deflected laterally upwardly from said channel until the button passes beyond the channel, the side load support then being removed so that the cable and the button are moved to a position with the cable in the channel and the button engaging a channel edge surface at said channel open other end in tension force transmitting relation for mechanism actuation by tension force applied through the cable.

* * * * *